(12) United States Patent
Asahara

(10) Patent No.: US 10,354,052 B2
(45) Date of Patent: Jul. 16, 2019

(54) LICENSE SYSTEM, LICENSE MANAGEMENT SERVER, METHOD, AND STORAGE MEDIUM

(71) Applicant: CANON KABUSHIKI KAISHA, Tokyo (JP)

(72) Inventor: Hideo Asahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 185 days.

(21) Appl. No.: 15/419,749

(22) Filed: Jan. 30, 2017

(65) Prior Publication Data

US 2017/0242985 A1 Aug. 24, 2017

(30) Foreign Application Priority Data

Feb. 19, 2016 (JP) .................................. 2016-029522

(51) Int. Cl.
*H04L 29/06* (2006.01)
*G06F 21/10* (2013.01)
*G06F 21/12* (2013.01)

(52) U.S. Cl.
CPC ............ *G06F 21/105* (2013.01); *G06F 21/10* (2013.01); *G06F 21/125* (2013.01); *G06F 2221/0771* (2013.01); *G06F 2221/0777* (2013.01)

(58) Field of Classification Search
None
See application file for complete search history.

(56) References Cited

U.S. PATENT DOCUMENTS

| 2002/0194010 A1* | 12/2002 | Bergler | G06Q 10/10 705/310 |
|---|---|---|---|
| 2003/0037237 A1* | 2/2003 | Abgrall | G06F 21/53 713/166 |
| 2004/0039594 A1* | 2/2004 | Narasimhan | G06F 21/10 705/1.1 |
| 2009/0133128 A1* | 5/2009 | Uchikawa | G06F 21/10 726/27 |
| 2009/0133131 A1* | 5/2009 | Cronce | G06Q 30/06 726/28 |
| 2010/0057703 A1* | 3/2010 | Brandt | G06F 21/10 707/E17.014 |
| 2011/0066721 A1* | 3/2011 | Shinomiya | G06F 21/10 709/224 |
| 2011/0125655 A1* | 5/2011 | Chiyo | G06F 21/10 705/310 |

FOREIGN PATENT DOCUMENTS

JP 2012-221054 A 11/2012

* cited by examiner

*Primary Examiner* — Shin-Hon (Eric) Chen
(74) *Attorney, Agent, or Firm* — Canon USA Inc., IP Division

(57) ABSTRACT

A license management server generates a license including information about update confirmation date and usage period. An image forming apparatus tries to communicate with the license management server until the usage period elapses since the update confirmation date.

8 Claims, 9 Drawing Sheets

FIG. 4

```
APPLICATION IDENTIFIER:1
DEVICE IDENTIFIER:1
LICENSE TYPE:Auto-Update
USAGE START DATE:2015/1/20
USAGE TERMINATION DATE:2015/2/28
UPDATE CONFIRMATION DATE:2015/2/20
ELECTRONIC SIGNATURE:a2349befa2384394875
```

401 LICENSE

FIG. 5

```
┌─────────────────────────────────────────────────────────┐
│              USAGE INFORMATION REGISTRATION             │
├─────────────────────────────────────────────────────────┤
│ IF YOU WANT TO REGISTER USAGE INFORMATION ABOUT A       │
│ COMMODITY, PLEASE ENTER APPLICATION IDENTIFIER AND      │
│ USAGE INFORMATION.                                      │
│                                                         │
│   ┌──────────────────────────┬──────────────────────┐   │
│   │ APPLICATION IDENTIFIER   │ 1                    │   │
│   └──────────────────────────┴──────────────────────┘   │
│                                                         │
│ USAGE INFORMATION                                       │
│   ┌──────────────────────────┬──────────────────────┐   │
│   │ DEVICE IDENTIFIER        │ 1                    │   │
│   ├──────────────────────────┼──────────────────────┤   │
│   │ USAGE START DATE         │ 2014/4/1             │   │
│   ├──────────────────────────┼──────────────────────┤   │
│   │ USAGE TERMINATION DATE   │ 2015/3/31            │   │
│   ├──────────────────────────┼──────────────────────┤   │
│   │ CLOSE DATE               │ 20th DAY             │   │
│   └──────────────────────────┴──────────────────────┘   │
│                                             ┌────────┐  │
│                                             │REGISTER│  │
│                                             └────────┘  │
└─────────────────────────────────────────────────────────┘
                                         501
                                  USAGE INFORMATION
                                  REGISTRATION SCREEN
```

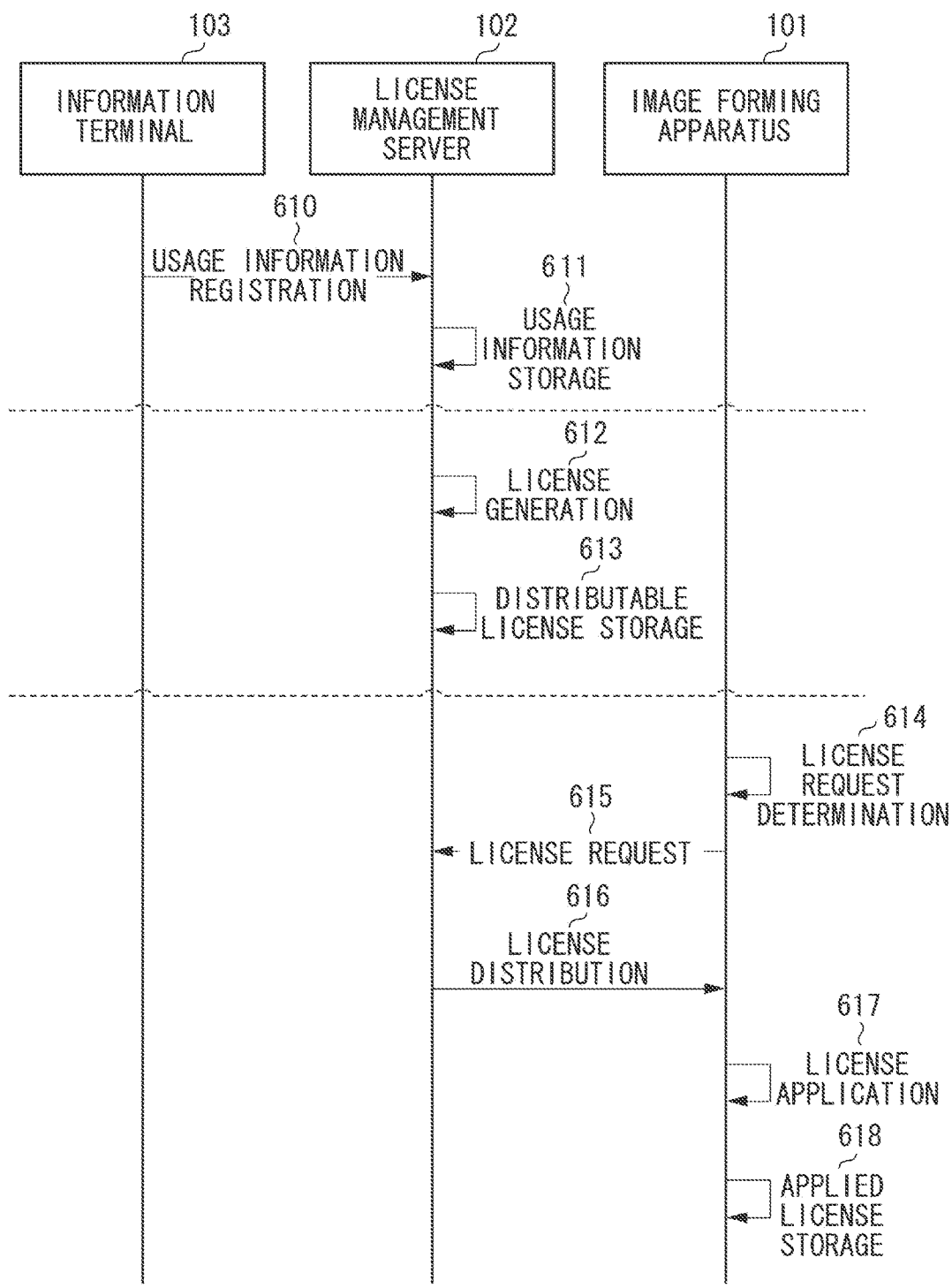

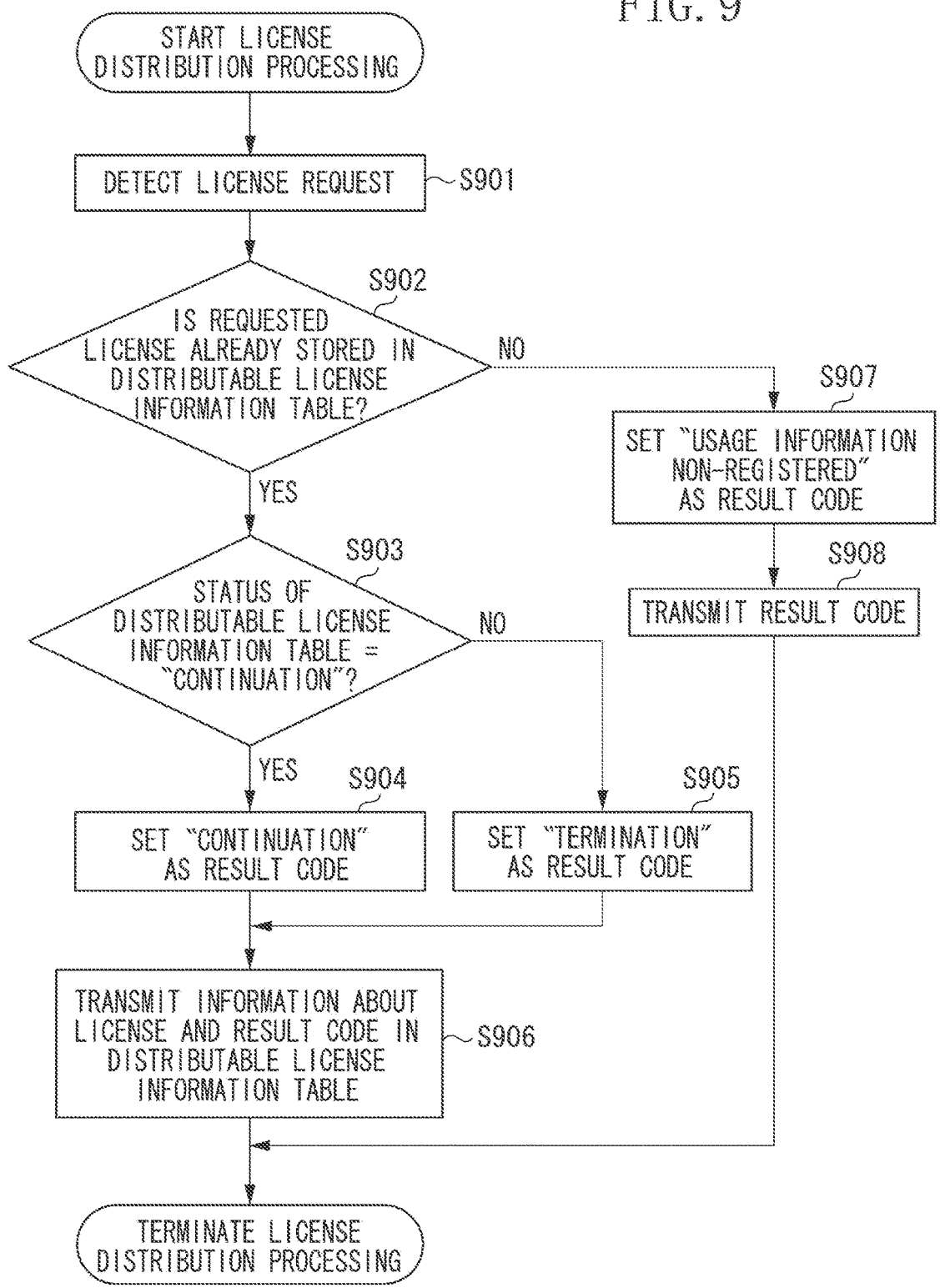

LICENSE SYSTEM, LICENSE MANAGEMENT SERVER, METHOD, AND STORAGE MEDIUM

BACKGROUND OF THE INVENTION

Field of the Invention

The present invention relates to a license system that issues a license and validates an application, a license management server, a method, and a storage medium.

Description of the Related Art

Image forming apparatuses have standardized fundamental functions (e.g., copy, print, and scan functions). In addition to those functions, there may be an optional expanded function for image forming apparatuses. In general, if a user wants to use such an expanded function, the user acquires a license by purchasing a commodity including the intended expanded function and uses the commodity based on the acquired license, as discussed in Japanese Patent Application Laid-Open No. 2012-221054.

SUMMARY OF THE INVENTION

According to a first aspect of the present invention, there is provided a license system. According to a second aspect of the present invention, there is provided a license management server. According to a third aspect of the present invention, there is provided a computer readable storage medium. According to a fourth aspect of the present invention, there is provided a method for controlling a license system.

Further features of the present invention will become apparent from the following description of exemplary embodiments with reference to the attached drawings.

BRIEF DESCRIPTION OF THE DRAWINGS

FIG. 4 illustrates an example of a license.

FIG. 5 illustrates an example of a usage information registration screen.

FIG. 6 is a sequence diagram illustrating a flow of automatic license update processing.

FIG. 9 is a flowchart illustrating license distribution processing.

DESCRIPTION OF THE EMBODIMENTS

In purchasing a commodity in which an expanded function is available, a user can select a subscription model that permits the user to use an intended expanded function for a contracted period by continuing periodical payment of usage fee. According to the above-mentioned model, to prevent any unauthorized usage of the commodity during a non-paid period, a management system can be provided to issue a license valid for a limited period corresponding to the paid usage fee and enable each user to update the license several times during the contracted period. However, there is a possibility that an image forming apparatus cannot use the expanded function equipped commodity temporarily if the image forming apparatus fails to communicate with a license management server to apply a new license at timing when the present license expires. To solve the above-mentioned problem, the image forming apparatus can be configured to communicate with the license management server every time a user uses an intended commodity of the image forming apparatus. However, a problem may arise in this case because the load of the license management server increases.

In view of the above-mentioned problem, the present invention intends to provide a mechanism for enabling an image forming apparatus to communicate with a license management server at appropriate timing and automatically update an intended license.

According to the present invention, the image forming apparatus can communicate with the license management server at appropriate timing and can automatically update the license.

Hereinafter, exemplary embodiments of the present invention will be described in detail below with reference to attached drawings.

Figure 1:
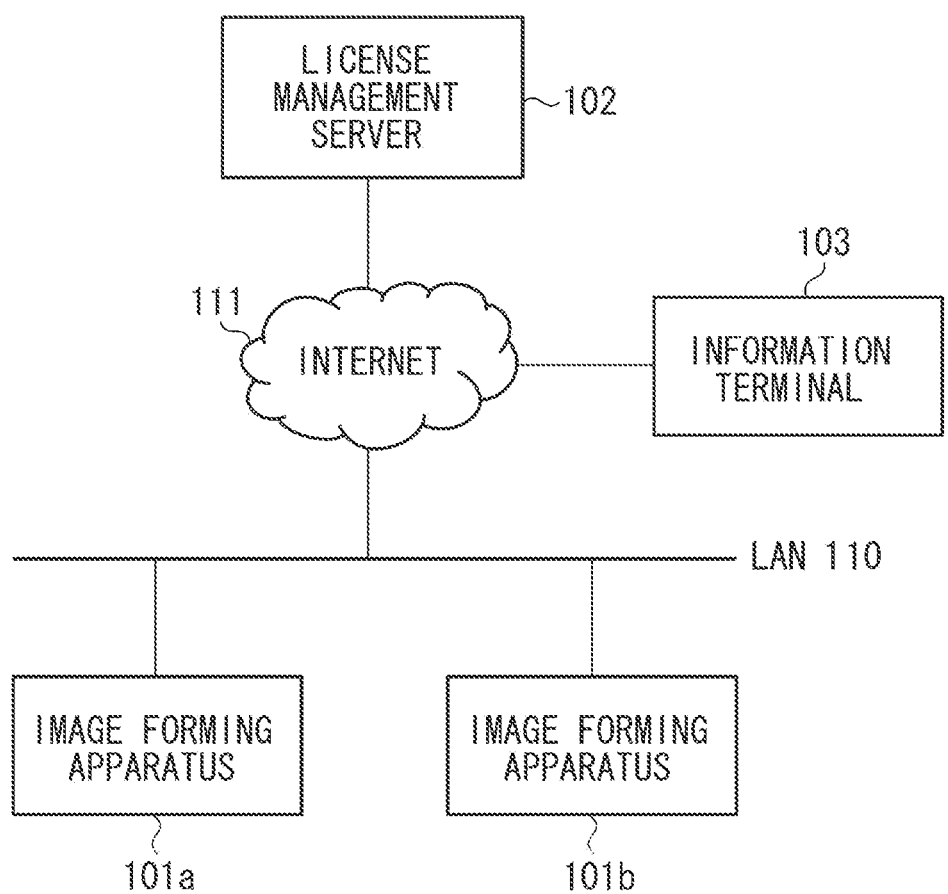
FIG. 1 illustrates a license system.

A first exemplary embodiment will be described below. FIG. 1 illustrates the entire configuration of a license system, which is a network configuration according to the present exemplary embodiment. An image forming apparatus 101 (101a, 101b) is a multi-function peripheral or a comparable apparatus having an image forming function.

A license management server 102 is a server that manages a license that validates an application running on the image forming apparatus 101. The application is a software program that enables the image forming apparatus 101 to use an expanded function and/or a standard function. The license is specific data that certifies the right to use the application. When the license is accurately applied to the image forming apparatus 101, an application corresponding to the applied license can be validated. A user can use the validated application. An exemplary license applying method is installing the license on the image forming apparatus 101.

An execution file for operating each application may be incorporated beforehand in a firmware of the image forming apparatus 101 or may be later downloaded to the image forming apparatus 101. The license management server 102 is not limited to a specific server and may be a license management service provided by an unfixed server (e.g., the structure of cloud computing). The license management server 102 provides various functions described in detail below with reference to FIG. 3.

An information terminal 103 is an information processing apparatus represented by a personal computer. The information terminal 103 includes a keyboard, a mouse, and a display device, or includes a touch panel, so that a user can operate a web browser. A local area network (LAN) 110 is a network line that connects the image forming apparatus 101 to an external network (Internet) 111. The Internet 111 is a network line via which the image forming apparatus 101, the license management server 102, and the information terminal 103 can communicate with each other. The image forming apparatus 101 and the information terminal 103 can communicate with the license management server 102 via the LAN 110 and the Internet 111.

Figure 2:
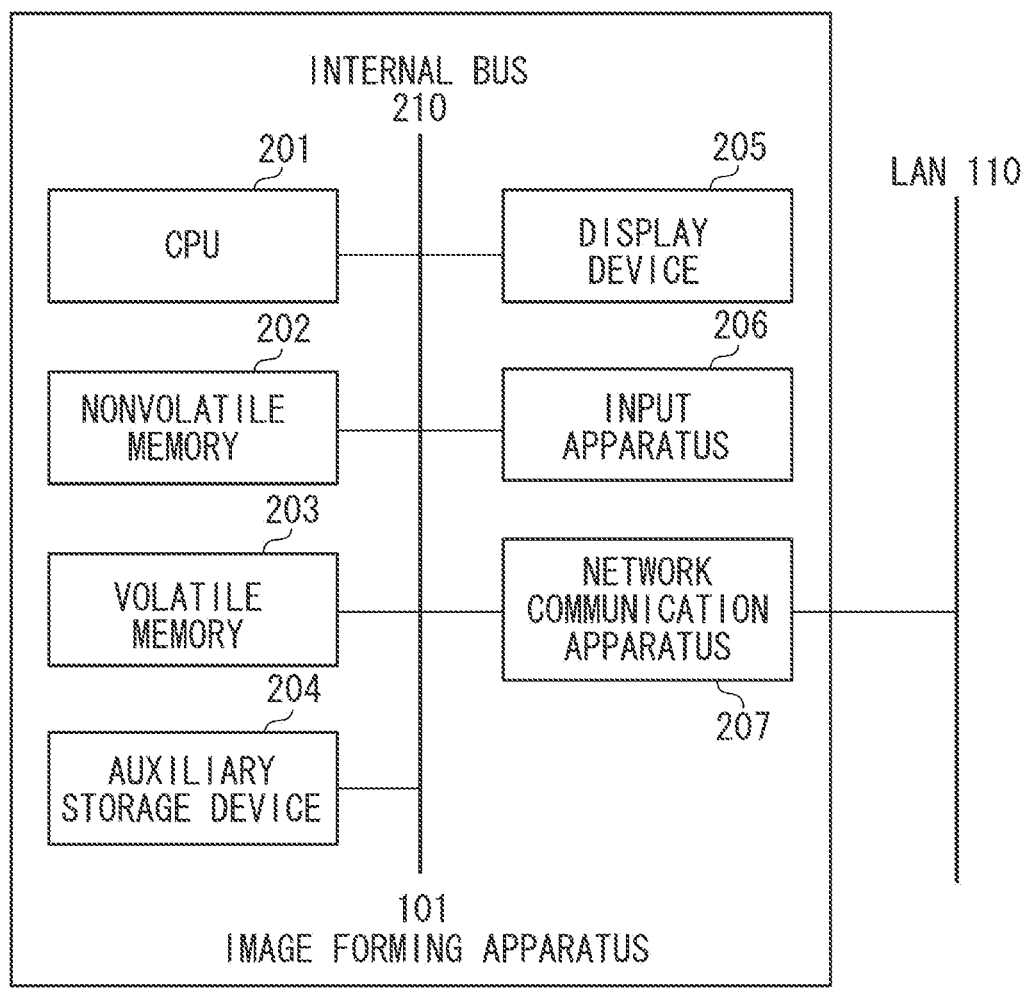
FIG. 2 illustrates a hardware configuration of an image forming apparatus.

FIG. 2 illustrates a hardware configuration of the image forming apparatus 101. A central processing unit (CPU) 201 executes programs and performs various control processing. A nonvolatile memory 202 is constituted by a read only memory (ROM) in which programs and data initially required in device startup processing are stored. A volatile memory 203 is constituted by a random access memory (RAM) that is used as a temporary storage space for data and programs. An auxiliary storage device 204 is a massive storage device, such as a hard disk drive, a RAM drive, or any other comparable device that stores large-scale data, program execution codes, and setting values of the image forming apparatus 101. Compared to the volatile memory 203, the auxiliary storage device 204 is used to store specific data to be stored for a long time. The auxiliary storage device 204 is a nonvolatile storage device that can continuously store data even in a state where no electric power is supplied to the image forming apparatus 101. A display device 205 presents information to a user.

An input apparatus 206 receives a selection instruction from a user and transmits the received instruction to a program via an internal bus 210. A network communication apparatus 207 enables the image forming apparatus 101 to communicate with another information device via the network. The internal bus 210 is a communication bus that connects respective hardware devices of the image forming apparatus 101 so that those devices can communicate with each other. Each of the license management server 102 and the information terminal 103 has a hardware configuration that is similar to the configuration illustrated in FIG. 2. Although not illustrated in the drawing, the image forming apparatus 101 includes a printing unit and/or a scanner unit.

Figure 3:
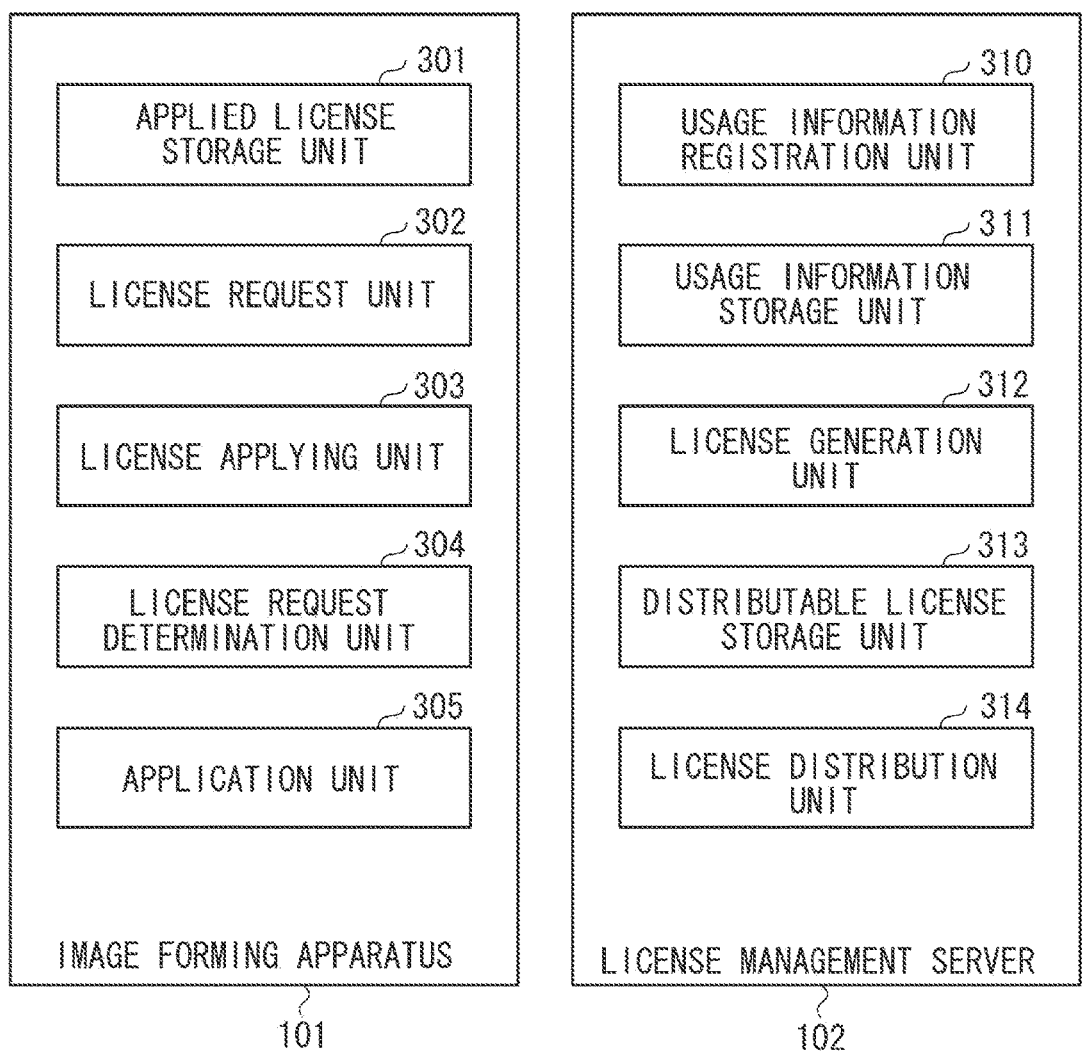
FIG. 3 illustrates a software configuration of the image forming apparatus and a software configuration of a license management server.

FIG. 3 illustrates a software configuration of the image forming apparatus 101 and a software configuration of the license management server 102. Each software unit constituting the image forming apparatus 101 is stored in the nonvolatile memory 202 or the auxiliary storage device 204 of the image forming apparatus 101. Each software unit fulfills the software unit's function when executed by the CPU 201. Further, the image forming apparatus 101 stores various types of information to be used in implementation in the volatile memory 203 or the auxiliary storage device 204 so that the information can be transmitted and received between respective software units. Each software unit constituting the license management server 102 is similarly stored in a nonvolatile memory (not illustrated) or an auxiliary storage device (not illustrated) provided in the license management server 102. Each software unit fulfills the software unit's function when executed by a CPU (not illustrated) that is similar to the CPU 201. Further, the license management server 102 stores various types of information to be used in implementation in the nonvolatile memory (not illustrated) or the auxiliary storage device (not illustrated) so that the information can be transmitted and received between respective software units.

Hereinafter, each software unit provided in the image forming apparatus 101 will be described in detail below. An applied license storage unit 301 has a function of storing a license applied to an application running on the image forming apparatus 101 in the auxiliary storage device 204. Table 1 is an exemplary applied license information table, which indicates applied license information stored in the applied license storage unit 301.

TABLE 1

Applied License Information Table

| Application Identifier | License Type | Usage Start Date | Usage Termination Date | Update Confirmation Date | Status |
|---|---|---|---|---|---|
| 1 | Auto-update | 2014 Dec. 20 | 2015 Jan. 30 | 2015 Jan. 20 | Continuation |
| 2 | Auto-update | 2014 Dec. 20 | 2015 Jan. 30 | 2015 Jan. 20 | Continuation |
| 3 | Auto-update | 2014 Dec. 20 | 2015 Jan. 30 | 2015 Jan. 20 | Continuation |
| 4 | Auto-update | 2014 Dec. 25 | 2015 Jan. 30 | 2015 Jan. 25 | Continuation |
| 5 | Auto-update | 2014 Dec. 25 | 2015 Jan. 30 | 2015 Jan. 20 | Continuation |
| 6 | Fixed | — | — | — | — |
| 7 | Auto-update | 2014 Nov. 20 | 2014 Dec. 31 | 2014 Dec. 20 | Termination |

In Table 1, the term "Application Identifier" indicates an identifier for uniquely identifying an application that runs on the image forming apparatus 101. In the table above, as examples, simple integers are used as the "Application Identifier". Alternatively, a complicated character string or UUID may be used as the "Application Identifier". Further, the term "License Type" indicates information indicating the type of an already applied license. In the Table 1, the "License Type" is "auto-update" type or "fixed" type. According to the "auto-update" type license, the license for the application is automatically updated through mutual communication between the image forming apparatus 101 and the license management server 102. The "auto-update" type license is a license of an application classified into a subscription model applied commodity. The "fixed" type license is a license that is not automatically updated. In the case of the "fixed" type license, once a commodity is the purchased, an application belonging to the commodity can be continuously used without updating the license for the application. The "fixed" type license is not automatically updated after the license is installed on the image forming apparatus 101 unless otherwise instructed by a user.

The term "Usage Start Date" indicates a date on which an application running on the image forming apparatus 101 becomes available. The term "Usage Termination Date" indicates a date on which the application running on the image forming apparatus 101 becomes unavailable. Usually, a usage termination date described in the license is set as the "Usage Termination Date". The term "Update Confirmation Date" indicates a date on which the applied license is automatically updated. Processing for updating the license to a new license is started on the "Update Confirmation Date", as described in detail below.

The term "Status" indicates whether to continue the processing for automatically updating the license if the license type is "auto-update" type. The term "continuation" indicates that the image forming apparatus 101 communicates with the license management server 102 and continues the processing for automatically updating the license for the application. The term "termination" indicates that it is unnecessary to perform the processing for automatically updating the license for the application. Thus, the image forming apparatus 101 does not automatically communicate with the license management server 102 to update the license. An exemplary procedure for registering information to the applied license information table will become apparent when a license applying unit 303 is described below. As described in detail below, each application determines the behavior thereof by referring to the applied license information table.

A license request unit 302 has a function of requesting the license management server 102 to issue a license for an application running on the image forming apparatus 101. The license request unit 302 transmits a license request to the license management server 102 via the LAN 110 or via the Internet 111. As a modified embodiment, it is feasible to provide another management server that is accessible via the LAN 110. The license request to be transmitted includes an application identifier of an application that requires the license and a device identifier of the image forming apparatus 101. Each license to be distributed from the license management server 102 can be file-formatted data or can be binary data.

FIG. 4 illustrates a license 401, as an example of the above-mentioned license. The license 401 is a file-formatted license file, which includes information identifying the right to use an application certified by the license 401. The license 401 includes information about application identifier, license type, usage start date, usage termination date, and update confirmation date, which are identical to those of Table 1. Information included in the license 401 finalizes Table 1. The license 401 further includes information about device identifier and electronic signature. The device identifier uniquely identifies the image forming apparatus 101 that uses the license 401. The electronic signature is a certificate to verify the correctness of the license 401. The license is not limited to the above-mentioned file-formatted license 401. Every kind of application validation information expressed by using electronic data can be referred to as "license" in the first exemplary embodiment.

The license applying unit 303 has a function of applying the license obtained by the license request unit 302 to the image forming apparatus 101. If the license is applied to the image forming apparatus 101, the applied license information table stored in the applied license storage unit 301 is updated. The license applying unit 303 confirms the presence of a record having an identifier that accords with the device identifier included in the license and then overwrites the information about license type, usage start date, usage termination date, and update confirmation date and stores the overwritten information for the record having the same application identifier. The status is not the information held by the license. The status is information about a result code received by the license request unit 302 in response to a license request. The license applying unit 303 receives the above-mentioned information and registers the received information to the applied license information table. The result code is information that can be received together with the license. In applying the license for the application, the license applying unit 303 performs status update processing based on the result code. If there is not any record having the same application identifier, the license applying unit 303 newly adds a record. The license is applied to the image forming apparatus 101 by applying the license and the image forming apparatus 101 can start using the application. The application partly constitutes the commodity. In other words, the procedure of providing the commodity to the user completes only after the image forming apparatus 101 is brought into a state where the application is freely usable based on the applied license.

A license request determination unit 304 has a function of determining whether it is necessary to request the license management server 102 to issue a license. The license request determination unit 304 determines to perform license request processing if the license type is "auto-update", the current date is in the duration between the update confirmation date and the usage termination date, and the status is "continuation". The license request determination unit 304 can control the timing for requesting the license management server 102 to issue a license and can control the number of times of request. The license management server 102 can transmit the above-mentioned information to the image forming apparatus 101 based on the license generated by a license generation unit 312. Exemplary processing that can be performed by the license request determination unit 304 will be described in detail below with reference to FIG. 8.

An application unit 305, which is an application running on the image forming apparatus 101, provides expanded functions and/or standard functions. Each operation of the application is controlled by the license. In other words, the application is operable only when a valid license is present in the applied license information table held by the applied license storage unit 301. An exemplary method for checking the presence of a valid license, for example, includes searching for a record corresponding to its own application identifier and checking if the current date is in the duration between usage start date and the usage termination date. If the usage start date and the usage termination date are not designated, it is determined that the license is valid. If there is not any designation with respect to the usage start date and the usage termination date, it can be regarded that the application is not classified into the subscription commodity. If there is not any record corresponding to its own application identifier, it can be determined that the application is invalid.

According to the example of Table 1, if the current date is 2015/1/20, it can be determined that the licenses of application identifiers 1 to 6 are valid and corresponding expanded functions can be provided. On the other hand, it is determined that the license of application identifier 7 is invalid because the usage termination date has already passed and the corresponding expanded function is unavailable. In the present exemplary embodiment, each application is configured to determine the validity of a license. However, as another embodiment, it may be useful to provide an application control unit (not illustrated) independently from the application. In this case, the application control unit validates or invalidates the expanded function provided by the application.

Next, each software unit provided in the license management server 102 will be described in detail below. A usage information registration unit 310 has a function of registering application usage information provided from the information terminal 103. More specifically, a user accesses the license management server 102 via the Internet 111 by using the web browser held by the information terminal 103 and registers the usage information via a usage information registration screen 501 provided by the usage information registration unit 310.

The usage information defines an application usage range and usage conditions. FIG. 5 illustrates an example of the usage information registration screen 501, which includes information about application identifier, device identifier, usage start date, and usage termination date. Numerical values described in the usage information registration screen 501 are similar to those illustrated in Table 1. The usage termination date described in Table 2 indicates the last date until which the application is available. The usage termination date described in Table 1 is a value having been set in the license and indicates the last date on which the application is usable based on the present license. In this respect, it should be noted that the above-mentioned two usage termination dates are different from each other. In FIG. 5, close date indicates a deadline for changing the usage information in every month. If the usage information is changed on or before the close date, the changed content can be reflected to the license in the next and subsequent months. According to the example illustrated in FIG. 5, the close date is the $20^{th}$ day. Therefore, it is assumed that the license for the next month is generated based on the usage information registered on or before the $19^{th}$ day. It is assumed that an application seller (i.e., a seller that sells an application to a client) is the subject that registers the usage information. In the present exemplary embodiment, the usage information can be manually registered via the web browser. However, it can be configured to notify usage information managed by another system through cooperation between respective systems.

A usage information storage unit 311 has a function of storing the usage information registered by the usage information registration unit 310. Table 2 is a usage information table indicating an example of the usage information stored in the usage information storage unit 311.

TABLE 2

Usage Information Table

| Device Identifier | Application Identifier | Usage Start Date | Usage Termination Date | Close Date | Scheduled License Generation Date | Usage Termination Date of Generated License |
|---|---|---|---|---|---|---|
| 1 | 1 | 2014 Apr. 1 | 2015 Mar. 31 | $20^{th}$ | 2015 Jan. 20 | 2015 Jan. 31 |
| 1 | 2 | 2014 Apr. 1 | 2015 Jan. 31 | $20^{th}$ | 2015 Jan. 20 | 2015 Jan. 31 |
| 1 | 3 | 2014 Apr. 1 | 2015 Feb. 10 | $20^{th}$ | 2015 Jan. 20 | 2015 Jan. 31 |
| 1 | 4 | 2014 Apr. 1 | Indefinite | $25^{th}$ | 2015 Jan. 25 | 2015 Jan. 31 |
| 2 | 1 | 2013 Apr. 1 | Indefinite | $20^{th}$ | 2015 Jan. 20 | 2015 Jan. 31 |

In Table 2, scheduled license generation date indicates a date on which the license is generated beforehand for the next license update to be determined based on the close date. According to the example of Table 2, the scheduled license generation date is the same as the close date. However, for example, due to circumstances of the license management server 102, the scheduled license generation date can be the next day of the close date or can be any other subsequent or preceding day. For example, setting the next day of the close date as the scheduled license generation date may be desired if it is necessary to temporarily prevent the license from being automatically issued in a case where the billing for the application is not yet fulfilled or delayed.

Hereinafter, another example of the usage information will be described in detail below. The above-mentioned usage information table (Table 2) can be modified in such a way as to determine the scheduled license generation date based on only the close date. In this case, the column of the scheduled license generation date can be omitted from the usage information table. Further, referring to the close date is not always necessary in determining the timing for automatically generating the license. When the close date is employed as the scheduled license generation date, the license generation can be surely performed at predetermined intervals. However, any other appropriate date can be employed if the license can be generated at arbitrary timing a plurality of times before the usage termination date. For example, the close date described in FIG. 5 can be replaced by the number of elapsed days. In this case, the license is updated only when the number of days designated by a user has elapsed. In other words, the license is not periodically updated at a predetermined day of every month. Therefore, the "period information" defined in the present exemplary embodiment indicates the information required when the license generation unit 312 generates the license a plurality of times before the usage termination date and required to determine the timing at which a license distribution unit 314 causes the image forming apparatus 101 to update the generated license.

In a case where an instruction to temporarily stop the usage of the application is transmitted to the license management server 102 because a user who has registered the usage information fails to fulfill the obligation to pay for the usage registered application, the license generation unit 312 does not generate any license. To attain the above-mentioned processing, in the present exemplary embodiment, when the stop instruction is received, the usage information storage unit 311 does not input any date in the field of the scheduled license generation date. However, the present exemplary embodiment is not limited to the above-mentioned example. For example, the usage information table can be modified in such a way as to additionally include an item (column) that determines whether to generate the license. If the license management server 102 receives the license generation stop instruction, the license management server 102 stops the license generation processing even when the current date is earlier than the usage termination date. The usage termination date of the already generated license is usage termination date of the license generated by the license generation unit 312 and is usage termination date of the generated latest license. The usage termination date of the already generated license is usable to determine whether to issue the next and subsequent licenses, as described in detail below with reference to FIG. 7.

The license generation unit 312 has a function of generating a license to be distributed to the image forming apparatus 101 based on the information stored in the usage information storage unit 311. FIG. 4 illustrates an example of the generated license. Each piece of information of the license can be set in the following manner. The application identifier and the device identifier are identical to those described in the usage information table. The license type is set to "auto-update" type, because only the application of the commodity of automatically updated license type is registered in the usage information table. As another exemplary embodiment, the usage information table can be configured in such a way as to additionally store and manage usage information about an application of non-automatically updated license type.

The date on which the license is generated is registered as the usage start date of the license 401. Usually, the license already applied to the image forming apparatus 101 is valid until the usage termination date of the generated license. Therefore, it can be configured to set the usage termination date of the already generated license as the usage start date of a newly generated license. However, a new license may be requested during a maintenance work for the image forming apparatus 101 (i.e., in a state where no license is applied). In this case, if the usage termination date of the already generated license is set as the usage start date of the newly generated license, the application will become unavailable until the usage start date after the new license is applied. Therefore, it is desired to set the date on which the license is generated as the usage start date. As a result, the valid period of the license generated by the license generation unit 312 is determined in such a way as to prevent the valid period from being interrupted in the duration from the scheduled license generation date to the usage termination date of the already generated license.

The usage termination date of the license 401 is set to the end of the next month if it is not later than usage termination date of the usage information table and set to the usage termination date of the usage information table if it is later than the usage termination date of the usage information table. The reason why the usage termination date is set to the end of the next month is because periodically applying a short-period license to the image forming apparatus 101 is desired with respect to the valid period of a long-period application stored in the license management server 102. For example, there is the possibility that the usage information may be later changed based on an agreement between the application seller and each application user. If the usage information is changed to set a new usage termination date, the application will be used unlawfully if a long-period license is continuously applied to the image forming apparatus 101 and will harm the application seller's profits. Therefore, in the present exemplary embodiment, a short-period license is applied to the image forming apparatus 101 with respect to long-period usage information.

The update confirmation date is set to the close date of the next month if it is not later than the usage termination date. If the close date of the next month is later than the usage termination date, the update confirmation is not performed and a null value is set. If the above-mentioned setting of the close date is replaced by another period information, such as the number of elapsed days, a value obtainable by adding the number of elapsed days to the license generation date is set as the update confirmation date. Anyway, the update confirmation date included in the license is determined based on the period information registered as the usage information in FIG. 5 (i.e., the information having been input by a user). Arbitrary values are usable to generate the electronic signature.

The above-mentioned embodiment has been described considering a situation that automatically updating the license every month is desirable. However, the embodiment can be modified appropriately. In the above description of the license information table, the number of elapsed days is employed to determine the close date and/or the scheduled license generation date, and the update confirmation date. As another example, if it is desired to automatically update the license every three months, it can be realized by setting the usage termination date to the end of subsequent three months and setting the update confirmation date to the close date of subsequent three months. If it is desired to automatically update the license every year, it can be realized by performing similar settings. If it is desired to freely change the update interval, the usage information registration screen 501 can be modified in such a way as to enable a user to input a desired automatic license update interval and store the input information in the usage information table. License generation conditions will be described in detail below with reference to FIG. 7.

A distributable license storage unit 313 has a function of storing the license generated by the license generation unit 312. As characteristic features of the present exemplary embodiment, the license generation is performed before the next license update date and the generation timing is earlier than the timing at which the license is requested from the image forming apparatus 101, as described above, although there is an exception "stop". A distributable license information table illustrated in Table 3 is a table indicating an example of the distributable license information stored in the distributable license storage unit 313.

TABLE 3

Distributable License Information Table

| Device Identifier | Application Identifier | License | Status |
|---|---|---|---|
| 1 | 1 | LicenseFile_1_1_20141220.lic | Continuation |
| 1 | 2 | LicenseFile_1_2_20141220.lic | Continuation |
| 1 | 3 | LicenseFile_1_3_20141220.lic | Continuation |
| 1 | 4 | LicenseFile_1_4_20141225.lic | Continuation |
| 2 | 1 | LicenseFile_2_1_20141220.lic | Continuation |

The license is the license 401, which is installed to operate an application running on the image forming apparatus 101 that can be identified with reference to the device identifier and the application identifier. The substance of the license is stored at a predetermined place in the structure of cloud computing in which the license management server 102 operates or in a file system of the server.

The status holds information to be referred to in determining whether to terminate the license update processing when the usage termination date of the application (i.e., the usage termination date included in the presently generated license) comes. If the status is "continuation", the license update processing will possibly be performed. If the status is "termination", it can be concluded that the license update processing is no longer performed. Although not described in Table 3, there may be a case where no license is registered. Such a state occurs when the above-mentioned license stop instruction is received. Because no license is generated in this state, the license file item of a target record becomes blank in Table 3. However, the status item is set to "continuation" condensing the possibility of generating a license again if the license stop instruction is released. If it is desirable, the status item can be set to "termination". Associating the license with the status is useful in that the license management server 102 can validate the application of the image forming apparatus 101 and, at the same time, can stop the license request processing. Information about the distributable license information table can be updated when the license generation unit 312 issues the license, as described in detail below with reference to FIG. 7.

The license distribution unit 314 has a function of distributing an appropriate license stored in the distributable license information table in response to a license update request from the image forming apparatus 101. The update request received from the license request unit 302 includes the device identifier and the application identifier. The license distribution unit 314 searches for a record agreeable with the request in the device identifier and the application identifier by referring to the distributable license information table stored in the distributable license storage unit 313. If there is a record agreeable with the request in the device identifier and the application identifier, the license distribution unit 314 acquires a license name and acquires a corresponding license stored in the predetermined place. If there is not any record agreeable with the request in the device identifier and the application identifier, the license distribution unit 314 refers to the usage information table stored in the usage information storage unit 311. The license distribution unit 314 searches for a record agreeable with the request in the device identifier and the application identifier by referring to the usage information table. The license distribution unit 314 transmits a search result to the image forming apparatus 101 (i.e., a request source). A detailed procedure of the license distribution processing will be described in detail below with reference to FIG. 9.

FIG. 6 is a sequence diagram illustrating a cooperative operation that can be realized by respective information devices illustrated in FIG. 1. In a step of "usage information registration" 610, the information terminal 103 registers usage information to the license management server 102. If a user enters usage information via the usage information registration screen 501 provided by the usage information registration unit 310, the information terminal 103 sends the usage information to the license management server 102. In a step of "usage information storage" 611, the usage information storage unit 311 stores the usage information registered by the usage information registration unit 310.

In a step of "license generation" 612, the license generation unit 312 generates a license based on the usage information stored in the usage information storage unit 311. The "license generation" step 612 is batch processing periodically performed by the license management server 102, independent of the processing flow of the "usage information registration" step 610 and the "usage information storage" step 611. Therefore, the license generation is performed asynchronously with the registration of the usage information. Detailed contents of the "license generation" step 612 will be described in detail below with reference to FIG. 7. In a step of "distributable license storage" 613, the distributable license storage unit 313 stores the license generated in the "license generation" step 612.

In a step of "license request determination" 614, the license request determination unit 304 performs determination processing. The "license request determination" step 614 is batch processing periodically performed by the image forming apparatus 101, independent of the processing flow of steps 610 to 613. Detailed contents of the "license request determination" step 614 will be described in detail below with reference to FIG. 8. In a step of "license request" 615, the license request unit 302 requests a license and the license distribution unit 314 receives the request. In a step of "license distribution" 616, the license distribution unit 314 searches for a license file to be distributed and then distributes the obtained license together with a result code thereof to the image forming apparatus 101. The license request unit 302 receives the distributed license and the result code. Detailed contents of the "license distribution" 616 will be described in detail below with reference to FIG. 9.

In a step of "license application" 617, the license applying unit 303 performs license application processing with reference to the license and the result code received in the "license distribution" step 616. There is a possibility that the license cannot be received although the result code has been received as described in detail below. In a step of "applied license storage" 618, the applied license storage unit 301 stores license information in response to the processing of the "license application" step 617.

Figure 7:
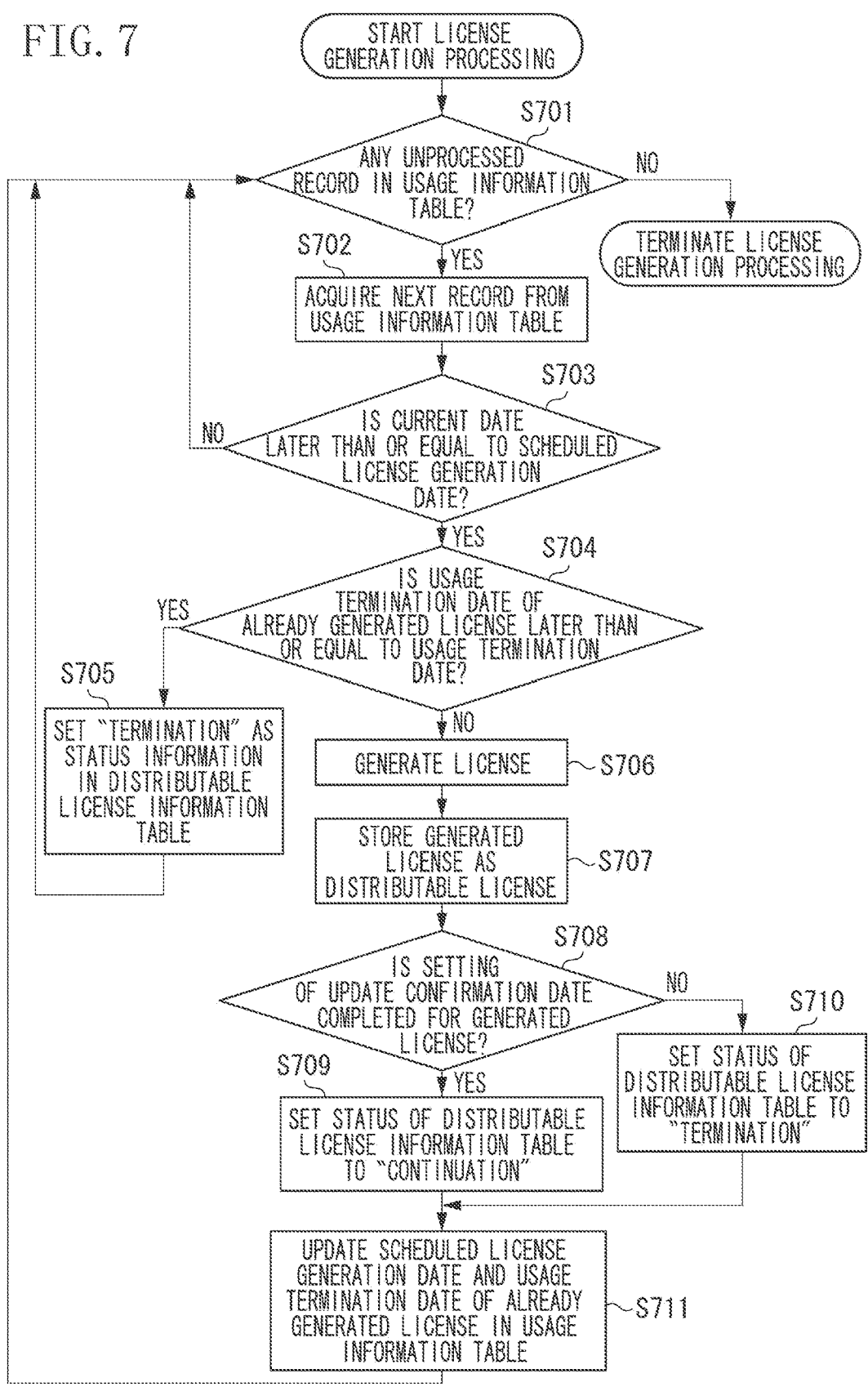
FIG. 7 is a flowchart illustrating license generation processing.

FIG. 7 is a flowchart illustrating a flow of the license generation processing performed by the license generation unit 312. In step S701, the license generation unit 312 determines whether there is any unprocessed record in the usage information table (i.e., the usage information table illustrated in Table 2 in the present exemplary embodiment). According to the example of Table 2, the total number of registered records is five. Thus, if it is tried to acquire a sixth record, the license generation unit 312 determines that there is not any unprocessed record. If the license generation unit 312 determines that there is at least one unprocessed record (YES in step S701), the operation proceeds to step S702. If the license generation unit 312 determines that there is not any unprocessed record (NO in step S701), the license generation unit 312 terminates the license generation processing.

In step S702, the license generation unit 312 acquires the next record from the usage information table. In step S703, the license generation unit 312 compares the current date with the scheduled license generation date of the record acquired in step S702. If the current date is later than the scheduled license generation date (YES in step S703), the operation proceeds to step S704. If the current date is not later than the scheduled license generation date (NO in step S703), the license generation unit 312 determines that it is unnecessary to generate a new license and returns the operation to step S701. If the processing target record is the first record in Table 2, the scheduled license generation date is 2015/1/20. So, if the current date is 2015/1/20 or later, the operation proceeds to step S704. If the current date is not later than 2015/1/20, the operation returns to step S701. If a new license is once issued, the license generation unit 312 resets the scheduled license generation date to the next month in step S711 described below, and thus the operation returns to step S701 (NO in the determination processing of step S703) until the next month.

In a case where no license is issued because the current date is later than the usage termination date of the application, or in a case where a license generation stop instruction is received, the license generation unit 312 sets a null value in the scheduled license generation date. In this case, it is assumed that the operation returns to step S701 because there is not any target to be compared with the current date. In the case where no license is issued because the current date is later than the usage termination date of the application, the license generation unit 312 may be configured to delete information about the license generation non-scheduled application from the usage information table and to return the operation to step S701. In the above-mentioned deletion processing, the license generation unit 312 performs a control to issue no license for the license generation target application.

In step S704, the license generation unit 312 determines whether the usage termination date of the already generated license is later than the usage termination date. If the usage termination date of the already generated license is later than or equal to the usage termination date (YES in step S704), the license generation unit 312 determines that generating a new license is no longer unnecessary. In this case, the operation proceeds to step S705. If the usage termination date of the already generated license is not later than the usage termination date (NO in step S704), the license generation unit 312 determines that it is necessary to generate a new license. In this case, the operation proceeds to step S706. According to the first record of Table 2, the usage termination date of the already generated license is 2015/1/31 and the usage termination date is 2015/3/31. Therefore, the license generation unit 312 determines that the usage termination date of the already generated license is not later than the usage termination date. More specifically, the license generation unit 312 determines that it is necessary to generate a new license. According to the second record of Table 2, the usage termination date of the already generated license is 2015/1/31 and the usage termination date is 2015/1/31. Thus, the license generation unit 312 determines that the usage termination date of the already generated license is the same as the usage termination date. More specifically, the license generation unit 312 determines that it is unnecessary to generate a new license.

In step S705, the license generation unit 312 updates status information in the distributable license information table. Because it is determined that the usage termination date of already generated license is later than the usage termination date (YES in step S704), it is no longer necessary to generate a new license. Therefore, the license generation unit 312 sets the status to "termination".

In step S706, the license generation unit 312 generates a license. The license generation unit 312 sets each piece of information about the license, as described above. Therefore, redundant description thereof will be avoided. In step S707, the distributable license storage unit 313 stores the license generated in step S706. The generated license is stored in the predetermined place. Further, the license generation unit 312 searches for a record agreeable with the license in the device identifier and the application identifier by referring to the distributable license information table. The license generation unit 312 changes the license name to the latest one and deletes the older license. The license generation unit 312 sets the status information in step S708 or subsequent step.

In step S708, the distributable license storage unit 313 determines whether there is update confirmation date having been set for the license generated in step S706. If it is determined that the update confirmation date is already set (YES in step S708), the operation proceeds to step S709. If it is determined that the update confirmation date is not yet set (NO in step S708), the operation proceeds to step S710. In step S709, the distributable license storage unit 313 sets the status of the distributable license information table to "continuation". In step S710, the distributable license storage unit 313 sets the status of the distributable license information table to "termination". In step S711, the usage information registration unit 310 updates the scheduled license generation date and the usage termination date of the already generated license in the usage information table. The usage information registration unit 310 registers the update confirmation date and the usage termination date of the latest license generated in step S706.

Through the above-mentioned procedure, the license management server 102 completes the license generation processing. The license management server 102 performs the license generation processing periodically, for example, at timing when the date stored by the license management server 102 changes. Thus, it becomes unnecessary to generate a new license in response to each reception of the license request 615. As a result, not only the response can be improved but also the load of the license management server 102 can be controlled adequately.

Table 4 and Table 5 illustrate updated results of Table 2 and Table 3, which are obtainable if the license generation processing is performed on 2015/1/20.

TABLE 4

Usage Information Table Updated Through License Generation Processing

| Device Identifier | Application Identifier | Usage Start Date | Usage Termination Date | Close Date | Scheduled License Generation Date | Usage Termination Date of Generated License |
|---|---|---|---|---|---|---|
| 1 | 1 | 2014 Apr. 1 | 2015 Mar. 31 | $20^{th}$ | 2015 Feb. 20 | 2015 Feb. 28 |
| 1 | 2 | 2014 Apr. 1 | 2015 Jan. 31 | $20^{th}$ | — | 2015 Jan. 31 |
| 1 | 3 | 2014 Apr. 1 | 2015 Feb. 10 | $20^{th}$ | — | 2015 Feb. 10 |
| 1 | 4 | 2014 Apr. 1 | Indefinite | $25^{th}$ | 2015 Jan. 25 | 2015 Jan. 31 |
| 2 | 1 | 2013 Apr. 1 | Indefinite | $20^{th}$ | 2015 Jan. 20 | 2015 Feb. 28 |

TABLE 5

Distributable License Information Table Updated Through License Generation Processing

| Device Identifier | Application Identifier | License | Status |
|---|---|---|---|
| 1 | 1 | LicenseFile_1_1_20150120.lic | Continuation |
| 1 | 2 | LicenseFile_1_2_20141220.lic | Termination |
| 1 | 3 | LicenseFile_1_3_20150120.lic | Termination |
| 1 | 4 | LicenseFile_1_4_20141225.lic | Continuation |
| 2 | 1 | LicenseFile_2_1_20150120.lic | Continuation |

The first record is usable on and after 2015/2. Therefore, a new license will be generated and the status is set to "continuation". The usage termination date of the second record is 2015/1/31 and the license for the second record is already generated. Therefore, as a determination result in step S704, no license is generated for the second record and the status is set to "termination" in step S705. The third record is usable on and after 2015/2. Therefore, a new license will be generated. However, the usage termination date of the third record is earlier than 2015/2/20. Therefore, as a determination result in step S708, the operation proceeds to step S710 in which the status is set to "termination". The scheduled license generation date of the fourth record is 2015/1/25. Therefore, as a determination result in step S703, no license is generated for the fourth record. The fifth record is different from the above-mentioned first to fourth records in the device identifier, although the rest thereof is similar to those of the first record.

Figure 8:
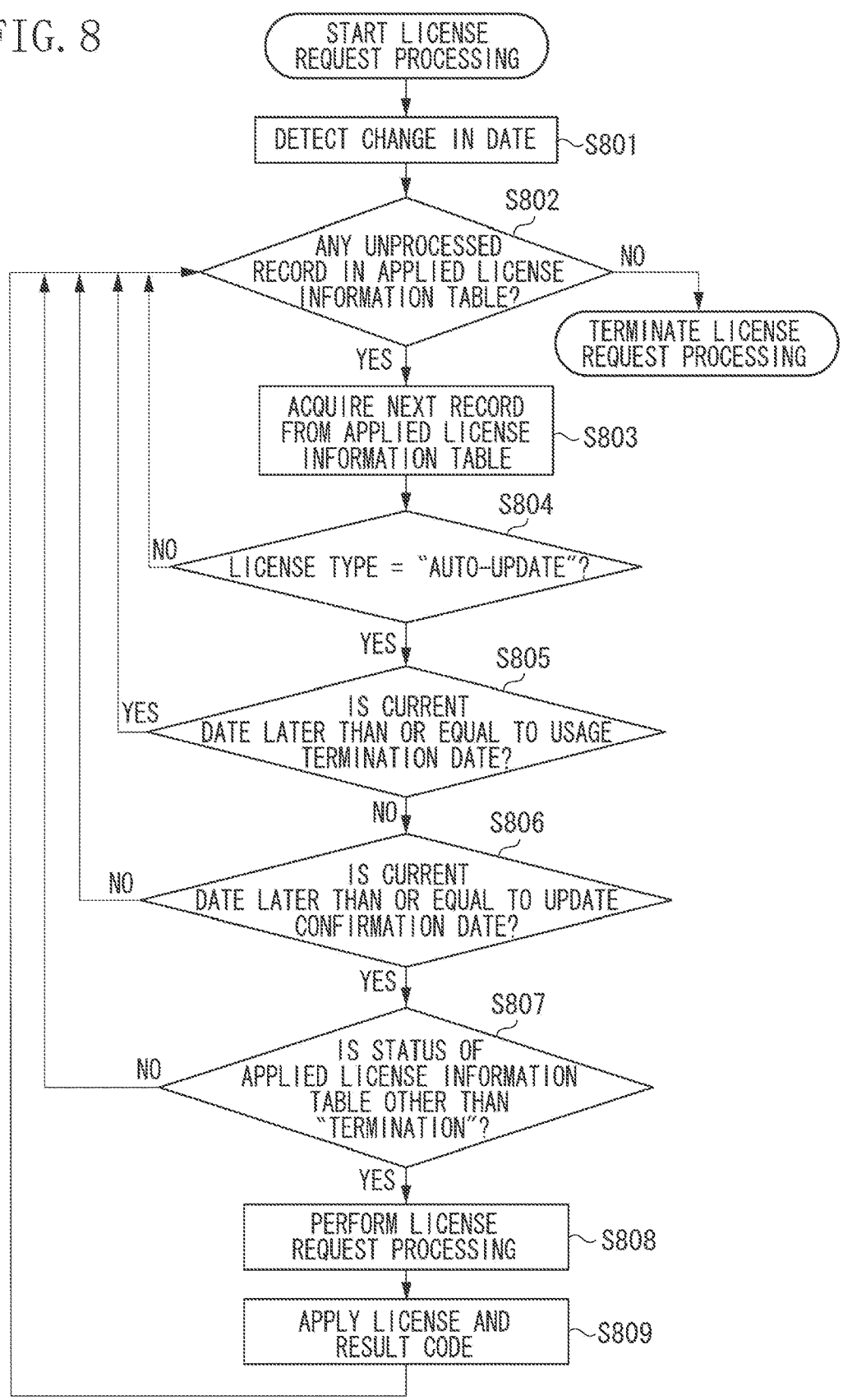
FIG. 8 is a flowchart illustrating license request processing.

FIG. 8 is a flowchart illustrating a flow of the license request processing that can be performed by the image forming apparatus 101. In step S801, the license request unit 302 detects a change in date. As mentioned above, the license update frequency is variable depending on a setting period. If the update frequency is higher, it will be necessary to check a change in date/time or hour/minute. If the update frequency is lower, it will be sufficient to check a change in month. Further, according to a license system that takes the number of elapsed days into consideration in issuing a license, it is necessary for the image forming apparatus 101 to take the number of elapsed days into consideration in performing the update processing. More specifically, in step S801, the image forming apparatus 101 determines whether license update confirmation is necessary at the present time.

In step S802, the license request unit 302 determines whether the processing in steps S803 to S809 has been completed for all records in the applied license information table. If it is determined that the above-mentioned processing has been completed for all records (NO in step S802), the image forming apparatus 101 terminates the processing of the flowchart illustrated in FIG. 8. If it is determined that there is at least one unprocessed record (YES in step S802), the operation proceeds to step S803. In this case, a record having the status "termination" is regarded as an already processed record and is not regarded as a target to be processed in and after step S803. As a result, the image forming apparatus 101 no longer requests the license management server 102 to issue a new license for a corresponding application.

In step S803, the license request unit 302 selects one of unprocessed records from the applied license information table. In step S804, the license request unit 302 determines whether the license type of the record selected in step S803 is "auto-update". If it is determined that the license type is "auto-update" (YES in step S804), the operation proceeds to step S805. If the license request unit 302 determines that the license type is not "auto-update" (NO in step S804), the operation returns to step S802. According to the example illustrated in Table 1, the license type of the sixth record is "fixed". Therefore, as a determination result in step S804, the operation returns to step S802. If the processing target record is not the sixth record, the operation proceeds to step S803. As another exemplary embodiment, the flowchart of FIG. 8 can be modified in such a way as to exclude the determination processing in step S804. For example, it can be configured that the license is not taken into consideration if the license type is "fixed". Any other license management table is employable.

In step S805, the license request unit 302 determines whether the current date is later than or equal to the usage termination date. When the current date is later than or equal to the usage termination date, it means that the target application is already unavailable. Therefore, the license request unit 302 determines that performing automatic update processing is unnecessary. In an exceptional case where the usage termination date passes before completing the registration of the usage information in the license management server 102, there is a possibility that the license request to the license management server 102 continues uselessly. This is the reason why the flowchart of FIG. 8 includes the above-mentioned determination processing in the present exemplary embodiment. However, as another exemplary embodiment, the flowchart of FIG. 8 can be modified in such a way as to exclude the determination processing in step S805. If the license request unit 302 determines that the current date is later than or equal to the usage termination date (YES in step S805), the operation returns to step S802. If it is determined that the current date is not later than the usage termination date (NO in step S805), the operation proceeds to step S806.

In step S806, the license request unit 302 determines whether the current date is later than or equal to the update confirmation date. If the current date is later than or equal to the update confirmation date set in the license 401, there is a new license generated by the license management server 102. Therefore, it is necessary to perform the license request processing. If the license request unit 302 determines that the current date is later than or equal to the update confirmation date (YES in step S806), the operation proceeds to step S807. If it is determined that the current date is not later than the update confirmation date (NO in step S806), the operation returns to step S802. In a case where the number of elapsed days is taken into consideration in determining the update confirmation date, the license request unit 302 confirms whether the designated number of elapsed days (e.g., "30" days) has elapsed on the current date. In short, in step S806, the license request unit 302 determines whether the current date satisfies the timing condition having been set beforehand.

In step S807, the license request unit 302 determines whether the status of the applied license information table is a status other than "termination". If the status is "termination", it means that the already applied license is valid until the usage termination date stored by the license management server 102. Therefore, it can be determined that the license request processing is unnecessary. If it is determined that the status is not "termination", more specifically when the status is "continuation" or "usage information non-registered" (YES in step S807), the operation proceeds to step S808. If it is determined that status is "termination" (NO in step S807), the operation returns to step S802.

Fundamentally, the processing of step S801 is performed periodically. Polling is performed from the image forming apparatus 101 to the license management server 102 when a license is request on or after step S808. However, the determination steps in steps S804 to S807 bring the effect of preventing the license request processing from being performed uselessly because the license request processing is performed only when an application that requires the license update processing is present.

In step S808, the license request unit 302 performs the license request processing. The license request processing has been already described in detail and therefore redundant description thereof will be avoided. The license management server 102 performs the license distribution processing in response to the received license request as described in detail below with reference to FIG. 9.

In step S809, the license applying unit 303 applies the license and the result code obtained in step S808. In a case where there is not any license having been issued, more specifically, if the received result code is "usage information non-registered", the license applying unit 303 stores a record of a corresponded application as the "usage information non-registered" without applying any license. Further, when no license is applied, the update confirmation date in the license information table is updated. Therefore, in step S808, the license request unit 302 requests the license management server 102 to issue the license again. More specifically, the license request unit 302 performs polling processing for repetitively requesting the license until the usage termination date. In a case where no license can be acquired even after the usage termination date has passed, the determination result in step S805 prevents the license request unit 302 from performing the license request processing. More specifically, the license request unit 302 stops the polling processing.

Table 6 illustrates an applied license information table obtainable on 2015/1/20 through the license request to the license management server 102 that stores Table 3, in a state where the applied license information table (Table 1) is stored.

TABLE 6

Applied License Information Table After Update Confirmation

| Application Identifier | License Type | Usage Start Date | Usage Termination Date | Update Confirmation Date | Status |
| --- | --- | --- | --- | --- | --- |
| 1 | Auto-update | 2015 Jan. 20 | 2015 Feb. 28 | 2015 Feb. 20 | Continuation |
| 2 | Auto-update | 2014 Dec. 20 | 2015 Jan. 30 | 2015 Jan. 20 | Termination |
| 3 | Auto-update | 2015 Jan. 20 | 2015 Feb. 10 | 2015 Jan. 20 | Termination |
| 4 | Auto-update | 2014 Dec. 25 | 2015 Jan. 30 | 2015 Jan. 25 | Continuation |
| 5 | Auto-update | 2014 Dec. 25 | 2015 Jan. 30 | 2015 Jan. 20 | Continuation |
| 6 | Fixed | — | — | — | — |
| 7 | Auto-update | 2014 Nov. 20 | 2014 Dec. 31 | 2014 Dec. 20 | Termination |

As illustrated in the distributable license information table (Table 5), respective items of the usage start date, the usage termination date, and the update confirmation date are updated if a license is generated. Further, the result code indicating a change in the status, if it occurs, is notified to the image forming apparatus 101 and the status of the applied license information table is updated.

FIG. 9 is a flowchart illustrating a flow of the license distribution processing that can be performed by the license management server 102. In step S901, the license distribution unit 314 detects that the license request has been received from the license request unit 302 of the image forming apparatus 101. In step S902, the license distribution unit 314 determines whether the license requested in step S901 is already stored in the distributable license information table. More specifically, the license distribution unit 314 searches for an appropriate record based on the device identifier and the application identifier included in the received license request by referring the distributable license information table. If it is determined that the requested license is already stored in the distributable license information table (YES in step S902), the operation proceeds to step S903. If it is determined that the requested license is not stored in the distributable license information table (NO in step S902), the operation proceeds to step S907.

In step S903, the license distribution unit 314 determines whether the status of the record identified in step S902 is "continuation". If it is determined that the status of the identified record is "continuation" (YES in step S903), the operation proceeds to step S904. If it is determined that the status of the identified record is not "continuation" (NO in step S903), the operation proceeds to step S905. In step S904, the license distribution unit 314 sets "continuation" as a result code to be transmitted to the license request unit 302.

In step S905, the license distribution unit 314 sets "termination" as a result code to be transmitted to the license request unit 302. In step S906, the license distribution unit 314 transmits an assembled data set, including the license for the record identified in step S902 and the result code having been set in step S904 or step S905, to the license request unit 302. In step S907, the license distribution unit 314 sets "usage information non-registered" as a result code to be transmitted to the license request unit 302. In step S908, the license distribution unit 314 transmits the result code having been set in step S907 to the license request unit 302.

As mentioned above, the first exemplary embodiment provides a mechanism for causing an image forming apparatus to communicate with a license management server at appropriate timing and automatically update the license.

In the first exemplary embodiment, a year/month/day format is employed to express the usage start timing and the usage termination timing to be set based on the usage start timing and the usage termination timing of an application and an application installed on the image forming apparatus 101. However, the format to be employed in determining the timing is not limited to the year/month/day format. For example, a hour/minute format or a year/month is employable if it is desirable.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-029522, filed Feb. 19, 2016, which is hereby incorporated by reference herein in its entirety.

What is claimed is:

1. A license system comprising an image forming apparatus configured to validate an application by applying a license to the application, and a license management server configured to issue the license, wherein the license management server includes at least one memory storing instructions and at least one processor that, upon execution of the instructions, causes the license management server:

receive an application identifier, a usage start time of the application, and a usage termination time of the application, and stores the received application identifier, the usage start time and the usage termination time together with period information and in association with a status that specifies whether to generate the license for the application, and, in a case where a valid period of the latest license for the application that is generated is earlier than the usage termination time, stores, as the status, information indicating that a license is generated for the application; and generate a license for a plurality of times for the application identified by the identifier during a period between the usage start time and the usage termination time, determine an update time at which the image forming apparatus is to next update the license for the application by referring to the period information, to generate a license including information relating to the determined update time, and to generate a new license for the application before the determined update time, and wherein the image forming apparatus includes at least one memory storing instructions and at least one processor that, upon execution of the instructions, causes the image forming apparatus to:

validate the application by installing the license generated by the management server and to set the update time based on information included in the license;

determine whether a detected time satisfies a condition based on the update time set by the management server; and request, in a case where it is determined that the detected time satisfies the condition based on the update time set by the setting unit, the license management server to generate the new license, wherein the license management server transmits a latest license for the application together with information for instructing the image forming apparatus to request the license for the application in a case where the information indicating that a license is generated for the application is stored as the status when the request is received, and the image forming apparatus, in a case where the request is received applies the latest license and requests a new license for the application at a new time set by the image forming apparatus.

2. The license system according to claim 1, wherein execution of the instructions by the at least one processor of the management server further causes the management server to not generate any license for the application in a case where a valid period of the latest generated license for the application is later than or equal to the usage termination time.

3. The license system according to claim 1, wherein, in a case where the management server receives a license generation stop instruction, the management server does not generate any license for the application even when the detected time is earlier than the usage termination time.

4. The license system according to claim 1, wherein execution of the instructions by the at least one processor of the license management server further causes the license management server to transmit information for instructing the image forming apparatus to request the license again in a case where the license is not generated by the license management server when the request is received from the image forming apparatus, and wherein, in a case where the image forming apparatus request unit receives the request to request the license again, the image forming apparatus repetitively requests the license management server to issue the license until the license is received.

5. The license system according to claim 1, wherein the management server stores the application identifier in association with a status that specifies whether to generate the license for the application, and, in a case where a valid period of the latest generated license for the application is after the usage termination time or equal to the usage termination time, the license management server stores, as the status, information indicating that no license is generated for the application, and wherein execution of the instructions by the at least one processor of the license management server further causes the license management server to transmit a new license for the application together with information for instructing the image forming apparatus not to request the license for the application in a case where the information indicating that no license is generated for the application is stored as the status when the request is received from the image forming apparatus, and wherein, in a case where the image forming apparatus receives the request not to request the license for the application, the image forming apparatus applies the new license and no longer requests a new license for the application.

6. A license management server communicable with an image forming apparatus, which is configured to validate an application by applying a license to the application, the license management server comprising:

at least one memory storing instructions; and at least one processor that, upon executing the instructions, configures the license management server to receive an application identifier, a usage start time of the application, and a usage termination time of the application, and stores the received application identifier, the usage start time and the usage termination together with period information and in association with a status that specifies whether to generate the license for the application, and, in a case where a valid period, of the latest license for the application that is generated is earlier than the usage termination time, stores, as the status, information indicating that a license is generated for the application;

generate a license for a plurality of times for the application identified by the identifier during a period between the usage start time and the usage termination time; and transmit the generated license in response to a license request received from the image forming apparatus, wherein the license management server further configured to determine a time at which the image forming apparatus is to next update the license for the application by referring to the period information, and to generate a license including information relating to the determined time, and to generate a new license for the application before the determined time, and transmits a latest license for the application together with information for instructing the image forming apparatus to request the license for the application in a case where the information indicating that a license is generated for the application is stored as the status when the request is received.

7. A non-transitory computer readable storage medium storing a program that causes a computer to execute a method for controlling a license management server that is communicable with an image forming apparatus configured to validate an application by applying a license, the method comprising:

receiving an application identifier, a usage start time of the application, and a usage termination time of the application, and stores the received application identifier, the usage start time and the usage termination time together with period information and in association with a status that specifies whether to generate the license for the application, and, in a case where a valid period of the latest license for the application that is generated is earlier than the usage termination time, stores, as the status, information indicating that a license is generated for the application;

generating a license for a plurality of times for the application identified by the identifier during a period between the usage start time and the usage termination time; and transmitting the generated license in response to a license request received from the image forming apparatus, wherein, in the generating, a time at which the image forming apparatus is to next update the license for the application is determined by referring to the period information, a license including information relating to the determined time is generated, and a new license for the application is generated before the determined time, wherein, in the transmitting, transmitting a latest license for the application together with information for instructing the image forming apparatus to request the license for the application in a case where the information indicating that a license is generated for the application is stored as the status when the request is received.

8. A method for controlling a license system that includes an image forming apparatus configured to validate an application by applying a license to the application, and a license management server that issues the license, the method comprising:

receiving an application identifier, a usage start time of the application, and a usage termination time of the application, and storing the received identifier, the usage start time and the usage termination time together with period information and in association with a status that specifies whether to generate the license for the application, and, in a case where a valid period of the latest license for the application that is generated is earlier than the usage termination time, stores, as the status, information indicating that a license is generated for the application;

generating a license for a plurality of times for the application identified by the identifier during a period between the usage start time and the usage termination time, determining a time at which the image forming apparatus is to next update the license for the application by referring to the period information, generating a license including information relating to the determined time, and generating a new license for the application before the determined time;

validating the application by installing the generated license and setting the update time based on information included in the license;

determining whether a detected time satisfies a condition based on the set update time; and requesting the license management server to generate the new license in a case where it is determined that the detected time satisfies the set update time, wherein the license management server transmits a latest license for the application together with information for instructing the image forming apparatus to request the license for the application in a case where the information indicating that a license is generated for the application is stored as the status when the request is received, and wherein, in a case where the request is received by the image forming apparatus, the image forming apparatus applies the latest license and requests a new license for the application at a new time set by the image forming apparatus.

* * * * *